(12) United States Patent
Pfeiffer et al.

(10) Patent No.: US 12,379,039 B2
(45) Date of Patent: Aug. 5, 2025

(54) EMERGENCY DEGASSING VALVE APPARATUS

(71) Applicant: Illinois Tool Works Inc., Glenview, IL (US)

(72) Inventors: Christian Pfeiffer, Enkenbach (DE); Melanie Sindel, Nuremberg (DE); Bernhard Aberle, Bad Tölz (DE)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/297,779

(22) Filed: Apr. 10, 2023

(65) Prior Publication Data

US 2023/0323973 A1 Oct. 12, 2023

(30) Foreign Application Priority Data

Apr. 11, 2022 (DE) .......................... 102022108771.9
Mar. 17, 2023 (DE) .......................... 102023106792.3

(51) Int. Cl.
| | |
|---|---|
| *F16K 24/02* | (2006.01) |
| *F16K 15/03* | (2006.01) |
| *F16K 15/14* | (2006.01) |
| *F16K 17/04* | (2006.01) |
| *F16K 17/36* | (2006.01) |
| *F16K 24/04* | (2006.01) |
| *H01M 50/325* | (2021.01) |

(52) U.S. Cl.
CPC ............ *F16K 24/02* (2013.01); *F16K 15/033* (2013.01); *F16K 17/0493* (2013.01); *F16K 17/363* (2013.01); *F16K 24/04* (2013.01); *F16K 15/148* (2013.01); *H01M 50/325* (2021.01); *Y10T 137/7779* (2015.04); *Y10T 137/789* (2015.04)

(58) Field of Classification Search
CPC ............... F16K 15/1401; F16K 15/148; Y10T 137/3584; Y10T 137/36; Y10T 137/7779; Y10T 137/7838; Y10T 137/789
See application file for complete search history.

(56) References Cited

U.S. PATENT DOCUMENTS

| | | | | |
|---|---|---|---|---|
| 1,471,855 | A | * 10/1923 | Mather | ................. F16K 17/194 |
| | | | | 137/550 |
| 2,351,874 | A | * 6/1944 | Parker | ................... F16K 17/196 |
| | | | | 137/542 |
| 3,929,158 | A | * 12/1975 | Rodgers | ................ F16K 15/148 |
| | | | | 137/493 |
| 4,352,364 | A | 10/1982 | Orsino | |
| 4,379,470 | A | * 4/1983 | Reutter | ................ F01P 11/0238 |
| | | | | 220/203.02 |

(Continued)

FOREIGN PATENT DOCUMENTS

| | | |
|---|---|---|
| DE | 3934687 C1 | 3/1991 |
| DE | 102021108861 | 12/2021 |

(Continued)

*Primary Examiner* — Robert K Arundale
(74) *Attorney, Agent, or Firm* — McAndrews, Held & Malloy, Ltd.

(57) ABSTRACT

An emergency degassing apparatus is provided, comprising a base body, an emergency degassing valve having an emergency degassing opening and a pressure cap for closing the emergency degassing opening, and a pressure compensation element (DAE) having a first and a second pressure compensation valve.

9 Claims, 3 Drawing Sheets

(56) References Cited

U.S. PATENT DOCUMENTS

| | | | | |
|---|---|---|---|---|
| 4,440,308 A | * | 4/1984 | Baker | F16K 15/1402 |
| | | | | 220/203.02 |
| 5,267,363 A | * | 12/1993 | Chaffee | F16K 15/148 |
| | | | | 5/713 |
| 5,507,318 A | * | 4/1996 | Israelson | F16K 15/1402 |
| | | | | 137/854 |
| 5,860,708 A | * | 1/1999 | Borders | B60B 7/00 |
| | | | | 301/108.4 |
| 2021/0381612 A1 | * | 12/2021 | Asada | F16K 17/196 |
| 2023/0358327 A1 | * | 11/2023 | Clericus | F16K 15/148 |

FOREIGN PATENT DOCUMENTS

| | | |
|---|---|---|
| DE | 102021123420 | 3/2022 |
| EP | 0222447 A1 | 5/1987 |
| EP | 0504573 | 9/1992 |
| EP | 0554535 A1 | 8/1993 |
| EP | 0588823 A1 | 3/1994 |
| EP | 0638944 | 2/1995 |
| EP | 0756338 A1 | 1/1997 |
| EP | 0920063 A1 | 6/1999 |
| EP | 1001905 A1 | 5/2000 |
| EP | 0875949 B1 | 3/2003 |
| EP | 1717884 | 11/2006 |
| FR | 2551172 | 3/1985 |
| FR | 2576149 | 7/1986 |
| FR | 2674376 | 9/1992 |
| GB | 567824 | 3/1945 |

\* cited by examiner

EMERGENCY DEGASSING VALVE APPARATUS

FIELD OF THE DISCLOSURE

The present disclosure relates to an emergency degassing valve apparatus.

BACKGROUND

Pressure relief valves protect pressurized spaces or pressure containers against a pressure increase that is inadmissible for a pressure device or a pressure system. If the response pressure is exceeded, gases, vapors or liquids are discharged into the atmosphere or into collecting pipes.

The pressure relief valve is a pressure relief means that begins to respond when the pressure exceeds the maximum allowable operating pressure in case of foreseeable disruptions. When an excess pressure is reached, e.g., 10% of the maximum allowable operating pressure, the safety valve has to be fully open. If the safety valve is dimensioned properly, the pressure build-up remains manageable. After the excess pressure has been relieved by blowing off into the environment, the valve closes again, as the case can be, and the system can continue to be operated.

Pressure relief valves are also installed in battery housings for batteries, in particular for high-voltage batteries, for example in electric vehicles.

EP 1 717 884 A1 describes a degassing valve for acid batteries. It comprises a substantially cylindrical plug part, which is configured for engaging with a cell opening of the acid battery and which comprises at least one through-opening connecting the cell interior of the acid battery to the surrounding atmosphere, wherein a valve arrangement is provided in the through-opening having a [sic] that communicates with the cell interior and is connected to the surrounding atmosphere. In order to provide a degassing valve for an acid battery, in particular an acid battery with a defined electrolyte, which is simple and inexpensive to produce and provides improved protection against the leakage of battery acid, it is proposed according to the invention that at least one swirl chamber adjoins the through-opening of the plug part in the direction of the cell interior and that a gas-permeable filter unit adjoins the swirl chamber.

EP 0 638 944 A1 describes a sealing plug for a lead accumulator, which is intended to prevent the leakage of acid mist from the cell and also rule out the damaging influence of the acid on the function of a safety valve provided in the sealing plug. The sealing plug comprises a microporous frit and a pressure relief valve in a housing that is sealed against the cell lid in the electrolyte filling opening.

DE 39 34 687 C1 discloses a closed, maintenance-free accumulator that can be used in a standing and prone position with a fixed electrolyte. In the lid of the accumulator housing, a filling opening is provided with a pressure relief valve. A projection to the inside of the housing is provided at the through-opening, from which a pipe extends parallel to the lid wall and opens into the gas space in the upper region of the accumulator. The path of gas exiting the accumulator thus leads through the pipe to the projection in the housing lid and then outwardly through the pressure relief valve.

Further degassing valves and sealing plugs for accumulators are described in the following publications: EP 0 920 063 A1, EP 0 756 338 A1, FR 2 576 149, EP 0 588 823 A1, GB 567 824, EP 1 001 905 A1, EP 0 875 949 B1, EP 0 588 823 A1, U.S. Pat. No. 4,352,364, FR 2 674 376, FR 2 551 172, EP 0 554, 535 A1, EP 0 504 573, EP 0 222 447 A1.

SUMMARY

The problem addressed by the present disclosure is to provide an emergency degassing valve apparatus that is safe and reliable in operation.

A further problem for the present disclosure is to provide an emergency degassing valve apparatus that is compact and requires a small design space.

In addition, a problem of the present disclosure is to form an emergency degassing valve apparatus that provides an alternative to an emergency degassing valve apparatus known in the prior art.

One or more of these problems are solved by the features set forth in the claims.

According to the present disclosure, an emergency degassing apparatus is provided. It comprises a base body, an emergency degassing valve having an emergency degassing opening and a pressure cap for closing the emergency degassing opening, and a pressure compensation element (DAE) having a first and a second pressure compensation valve.

According to a first embodiment, the pressure compensation element is preferably arranged in the pressure cap of the emergency degassing opening of the emergency degassing valve.

Because the pressure compensation element is arranged in the pressure cap of the emergency degassing opening of the emergency degassing valve, the emergency degassing apparatus according to the present disclosure is extremely compact and requires only a very small design space.

Furthermore, a spring device can be provided, which is configured so as to exert a specified force on the pressure cap so that the pressure cap is retained in a closed position, wherein the spring device is configured such that, upon reaching a specified internal pressure in a space to be degassed, the spring device releases the pressure cap.

The spring device can be configured such that the emergency degassing opening remains open, even when a specified internal pressure in a space to be degassed is again under-shot.

The pressure cap can be connected via a hinge or rotary joint to the base body adjacent to the emergency degassing opening in an articulated or folded manner.

The spring device can also comprise the following components: a preferably rod-shaped spring or biasing wire, at least one and preferably a plurality of receiving elements arranged on the base body in the region of the emergency degassing opening and opposite the rotary joint, wherein the receiving elements comprise a receiving space for receiving the spring, preferably in a releasable manner, and a preferably hook-like spring-retaining element arranged on the pressure cap, wherein the spring is preferably releasably received in a spring-receiving space of the spring-retaining element, wherein, upon reaching the specified internal pressure in the space to be degassed, the spring device is released from the receiving elements and/or the spring-retaining element and, in this way, releases the pressure cap.

Accordingly, the spring device is simply constructed.

Because the approximately rod-shaped spring is releasably received in the receiving spaces of the receiving elements or abuts in the receiving spaces and likewise the spring is releasably received in the spring-receiving space of the spring-retaining element, the pressure cap opens at a specified internal pressure in a simple manner as well as securely and reliably.

Furthermore, by a suitable choice of the rod-shaped spring or a corresponding spring hardness of the rod-shaped spring or the biasing wire, the specified internal pressure of the space to be degassed can be adjusted.

The first and second pressure compensation valves of the pressure compensation element can comprise first and second valve through-openings and a first and second membrane device for respective closure of the first and the second valve through-openings.

The first and second pressure compensation valves can be arranged opposite one another, meaning that the first and the second pressure compensation valves release or enable opposite flow paths or a flow in opposite directions, such that the pressure compensation valve forms a double check valve.

By providing the pressure compensation element with a first and a second pressure compensation valve forming a double check valve, a pressure compensation in a space to be degassed in both directions is possible, which means that both a positive pressure and a negative pressure in the space to be degassed can be compensated.

The pressure compensation valve can comprise a cover device for protectively covering the pressure compensation valve, wherein the cover device comprises a frame and a lid that bound a pressure compensation space, and wherein the frame is arranged circumferentially around the first and the second valve through-opening and the lid covers the pressure compensation space. The lid can be arranged spaced apart from the frame such that a pressure compensation gap is preferably formed radially circumferentially between the frame and the lid. The lid can be connected to the frame via a hinge element, in particular a film hinge, and a catching element device.

The pressure compensation valve is reliably protected against mechanical damage by the cover device.

By having the lid spaced apart from the frame such that a pressure compensation gap is formed between the frame and the lid, the first and the second pressure compensation valves of the pressure compensation element can provide a pressure compensation across the pressure compensation gap.

The pressure compensation space can comprise a gas-permeable protective membrane connected to the frame in the region of the lid such that the first and the second pressure compensation valves are covered. In addition, a support structure for mechanically stabilizing the protective membrane can be provided.

By providing a support structure, the mechanical stability of the protective membrane is significantly increased and protected against damage.

A corresponding pressure compensation of the first and the second pressure compensation valve of the pressure compensation element can also take place through the gas-permeable protective membrane, wherein the gas-permeable protective membrane still covers the first and the second pressure compensation valve or a space to be degassed, respectively, and in this way protects against moisture and dirt, in particular dust.

The base body can comprise connecting means, preferably bushings, made of plastic or metal, for connecting to a space to be degassed.

Preferably, metal bushings are provided.

However, plastic bushings can also be provided. By providing plastic bushings, corrosion is avoided. In addition, plastic bushings are not electrically conductive. By means of the plastic bushings, both weight and costs can therefore be saved.

Furthermore, the base body on a surface to be connected to a space to be degassed can comprise a first sealing device for sealingly connecting to the space to be degassed.

In addition, a second sealing device can also be provided for sealing a sealing surface between the emergency degassing opening and the pressure cap.

The sealing means for sealing abutment on the degassing space and/or for sealing the sealing surface between the emergency degassing opening and the pressure cap can preferably be configured integrally, wherein two annular sealing means of the sealing device are connected via corresponding struts arranged orthogonally to the sealing means.

Alternatively, two separate sealing means can also be provided.

The base body is formed from a plastic, for example PA6 or PA66 or V0, having at least 30% content of recyclable material.

Preferably, the emergency degassing apparatus is manufactured by means of an injection molding process, wherein a 2-component injection molding machine is in particular provided in order to form the corresponding sealing device(s) in one working step with the emergency degassing valve apparatus.

The protective membrane is preferably a Teflon membrane with an IPX7 classification. It is in particular connected to the frame by means of ultrasonic welding. The surface covering the protective membrane is designed for a flow of about 4.2 liters per minute at 40 mbar.

The membrane devices are preferably made from silicone in order to ensure a corresponding back-pressure. Here, a setting of the back-pressure by biasing and/or a corresponding Shore hardening grade can be possible.

According to a further exemplary embodiment, the pressure compensation element can also be arranged adjacent to the emergency degassing valve in the base body.

Furthermore, according to the present disclosure, a housing with an emergency degassing valve apparatus shown above is provided, wherein the emergency degassing valve apparatus is connected to a housing of a space to be degassed.

Similarly to the two exemplary embodiments of the German patent application bearing the publication number DE 10 2021 123 420.4, the emergency degassing valve can be configured, to which reference is herewith made in full.

That is to say, the emergency degassing valve according to the first embodiment can comprise a collapsible pressure cap.

On the other hand, the emergency degassing valve of the emergency degassing apparatus according to the second exemplary embodiment can comprise both a gas-tight, collapsible pressure cap and a gas-permeable pressure cap preferably attached by means of a biasing wire.

The pressure cap can thus be configured as a separate component.

The pressure cap can be gas-tight or permeable.

The gas-tight pressure cap can be convexly formed from a plastic, preferably silicone, and/or in an ejection direction.

The gas-permeable pressure cap can be a permeable membrane, preferably having an annular frame, or the permeable pressure cap can be gas-tight and have at least one degassing opening.

In a gas-permeable pressure cap, the spring device can be a biasing wire arranged on the pressure cap approximately transverse to an assembly direction and can be arranged in a receiving portion of a base body and/or the pressure cap, wherein a biasing force, in particular a spring force of the biasing wire, is configured such that the pressure cap releases the emergency degassing opening upon reaching a specified positive pressure in the space to be degassed.

The receiving portion of the base body and/or the pressure cap can comprise at least a portion of a radially circumferential inner wall and/or at least two receiving elements arranged approximately diametrically opposite to one another, wherein the receiving elements extend radially inward in approximately the assembly direction and/or with respect to the base body.

A spring device for a collapsible pressure cap according to the first exemplary embodiment or according to the second exemplary embodiment can be connected to the pressure cap, wherein the spring device comprises a spring and a lever mechanism, and wherein the lever mechanism and the spring are configured such that the pressure cap can be released and held in an open position upon reaching a specified positive pressure in the space to be degassed.

The membrane devices of the first and the second pressure compensation valves of the pressure compensation element can be configured similar to the exemplary embodiments of the membranes configured in the German patent application bearing the publication number DE 10 2021 108 861.5 and arranged so as to cover the valve through-openings. Reference to DE 10 2021 108 861.5 is herewith also made in full.

Thus, the membrane device can be configured for covering the valve through-openings of the corresponding pressure compensation valves, wherein the membrane device is connected to a membrane receiving device and is sealingly arranged on an annular sealing wall such that the valve through-opening is closed.

The membrane-receiving device can thus be configured and dimensioned such that the membrane-receiving device exerts a force on a radially circumferential sealing edge of the membrane device in the direction of the sealing wall such that the sealing edge sealingly rests against the sealing wall under a bias.

The membrane device can comprise a fastening recess in which a fastening portion of the membrane-receiving device is received in a contacting manner or can be releasably fastened by means of a press fit and/or a respective radially circumferential catching edge and a correspondingly configured radially circumferential catching recess.

A centering ring can further be formed in the valve through-opening, which ring comprises a membrane receptacle in the region of the membrane device for receiving a pin of the membrane device.

The emergency degassing valve apparatus is provided in particular for relieving an excess pressure in a battery housing for receiving a battery device, preferably a high-voltage battery, wherein the emergency degassing valve apparatus can be arranged and fastened in a through-opening of a support component, in particular a battery housing, wherein the support component can be an aluminum profile.

BRIEF DESCRIPTION OF THE DRAWINGS

The present disclosure will now be described in further detail on the basis of two exemplary embodiments shown in the figures.

The figures show.

DETAILED DESCRIPTION

Figure 1:
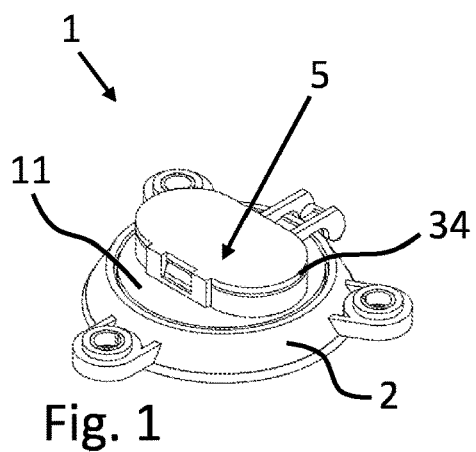
FIG. 1—a perspective illustration of an emergency degassing valve apparatus according to the disclosure according to a first exemplary embodiment, FIG. 2—is a perspective illustration of the emergency degassing valve apparatus with the pressure cap open, FIG. 3—a plan view from below of the emergency degassing valve apparatus, FIG. 4—a laterally cut illustration of the emergency degassing valve apparatus, FIG. 5—a further plan view from below of the emergency degassing valve apparatus, FIG. 6—a further laterally cut illustration of the emergency degassing valve apparatus, FIG. 7—a lateral view of the emergency degassing valve apparatus, FIG. 8—a laterally cut illustration of the emergency degassing valve apparatus, FIG. 9—a perspective illustration of a pressure cap of the emergency degassing valve apparatus, FIG. 10—a further perspective illustration of the pressure cap of the emergency degassing valve apparatus, FIG. 11—a plan view from above of the pressure cap of the emergency degassing valve apparatus, FIG. 12—a further perspective illustration of the pressure cap of the emergency degassing valve apparatus, FIG. 13—a further perspective illustration of the pressure cap of the emergency degassing valve apparatus, FIG. 14—a further perspective illustration of the pressure cap of the emergency degassing valve apparatus, FIG. 15—a plan view from above of a base body of the emergency degassing valve apparatus, FIG. 16—a perspective illustration of the base body of the emergency degassing valve apparatus, FIG. 17—a further perspective illustration of the base body of the emergency degas-sing valve apparatus, FIG. 18—a perspective illustration of an emergency degassing valve apparatus according to a second embodiment, and FIG. 19—a further perspective illustration of the emergency degassing valve apparatus according to the second embodiment.
Figure 2:
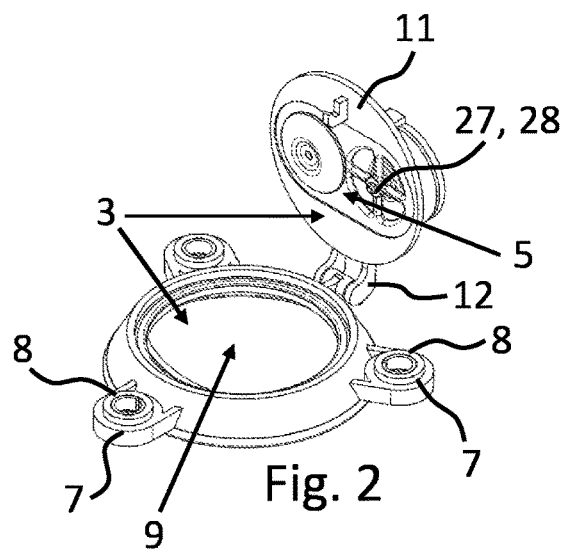
Figure 3:
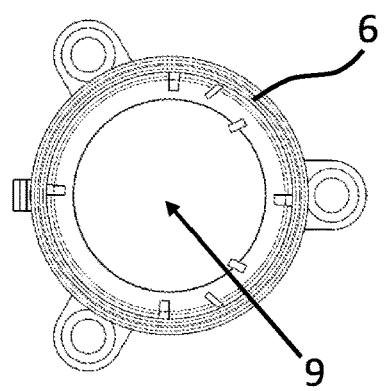
Figure 4:
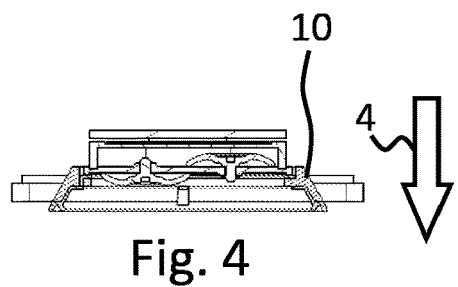
Figure 5:
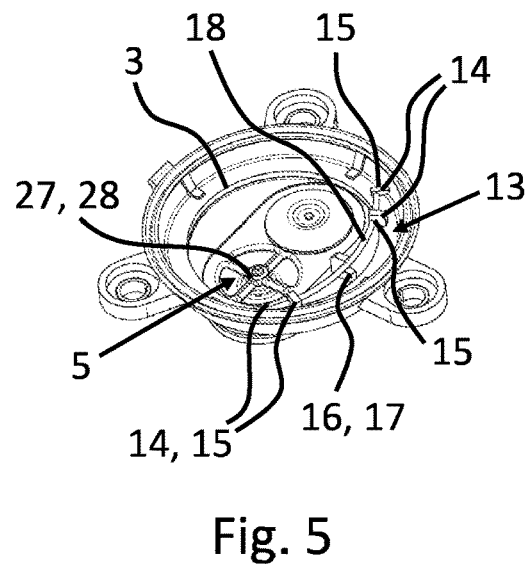
Figure 6:
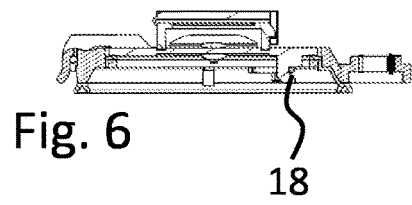
Figure 7:
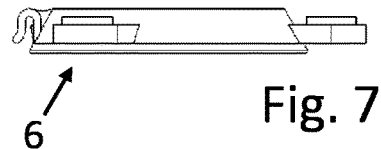
Figure 8:
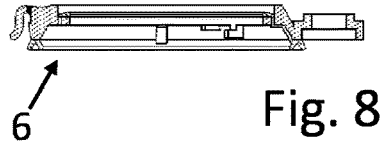
Figure 9:
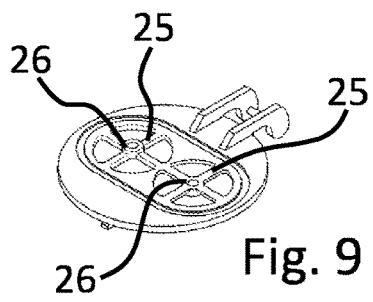
Figure 10:
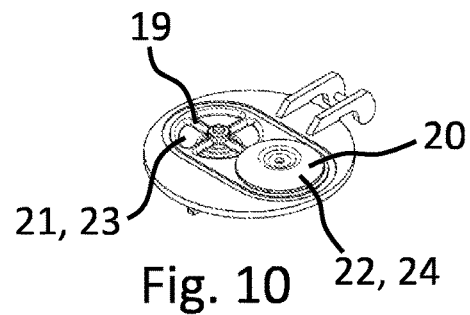
Figure 11:
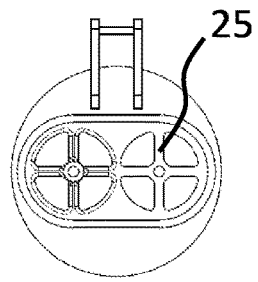
Figure 12:
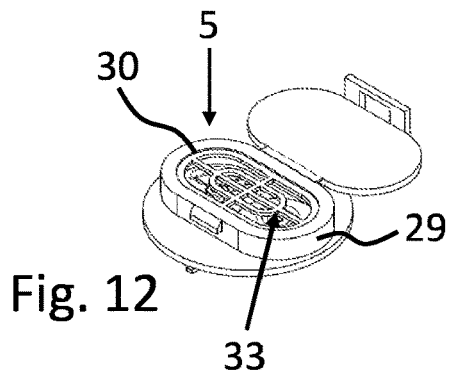
Figure 13:
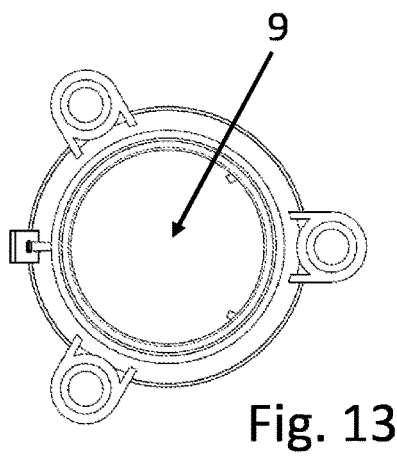
Figure 14:
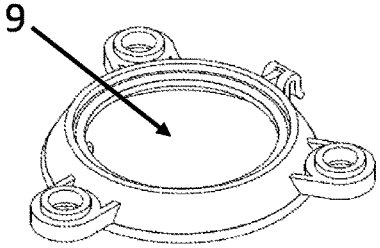
Figure 15:
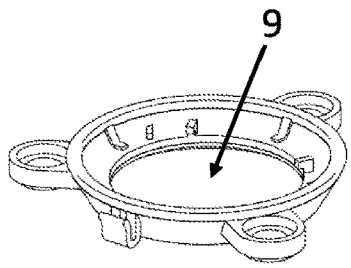
Figure 16:
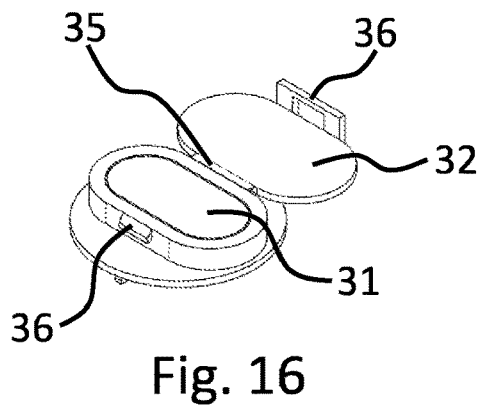
Figure 17:
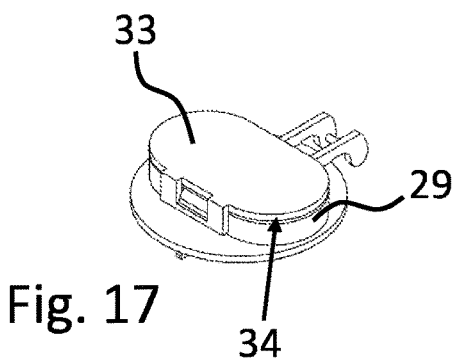

Reference is made herewith to the full content of the structural embodiments and the technical features of the apparatuses described in DE 10 2021 123 420.4 and DE 10 2021 108 861.5. Accordingly, the correspondingly configured components of the emergency degassing valve apparatus according to the present disclosure can be configured like the components described in these two patent documents.

In the following, an emergency degassing valve apparatus 1 according to the present disclosure is described in further detail on the basis of a first exemplary embodiment (FIGS. 1 to 17).

The emergency degassing valve apparatus 1 comprises a base body 2, an emergency degassing valve 3, and a pressure compensation element 5.

The base body 2 comprises an assembly wall 6 for connecting to a space to be degassed.

According to the first exemplary embodiment, the base body 2 is configured so as to be approximately annular in shape, wherein preferably three bushing receptacles 7 are integrally formed in a radially circumferential manner and equally spaced apart from one another, into which corresponding assembly bushings 8 made of plastic or metal are inserted.

In the annular base body 2, an emergency degassing opening 9 is formed.

In addition, a sealing device 10 is provided. The sealing device 10 is integrally formed on the base body by means of a 2-component injection molding process. The sealing device 10 is annular in shape in the region of the assembly wall 10 and preferably comprises two sealing lips extending in an assembly direction. Furthermore, the sealing device 10 surrounds the emergency degassing opening in a radially circumferential manner and is also annular in shape in this region in order to seal the emergency degassing opening 9 against a pressure cap. In addition, the sealing device 10 comprises struts for connecting the two annular sealing means of the sealing device 10 to one another.

The emergency degassing opening 9 can be closed by means of a collapsible pressure cap 11. The pressure cap 11 is connected to the base body 2 via a hinge 12.

The emergency degassing valve 3 thus comprises the emergency degassing opening 9 and the pressure cap 11 and additionally a spring device 13.

The spring device 13 is configured so as to exert a specified force on the pressure cap 11 so that the pressure cap 11 is retained in a closed position, wherein the spring device 13 is configured such that, upon reaching a specified internal pressure in a space to be degassed, the spring device 13 releases the pressure cap 11.

The spring device 13 comprises a rod-shaped spring 18.

Furthermore, the spring device 13 comprises four receiving elements 14, which are approximately L-shaped and are formed on the base body 2 in the region of the emergency degassing opening 9, wherein the receiving elements 14 bound a receiving space 15 which faces radially inward.

A hook-like spring-retaining element 16 is integrally formed on the side of the pressure cap 11 facing towards a space to be degas sed. The spring-retaining element 16 is also configured so as to be approximately L-shaped and bounds a spring-receiving space 17 for receiving the spring 18 or a corresponding biasing wire 18.

According to the first exemplary embodiment, the pressure compensation element 5 (DAE) is arranged in the pressure cap 11.

The pressure compensation element 5 comprises a first and a second pressure compensation valve 19, 20.

The first pressure compensation valve 19 comprises a first valve through-opening 21 and a first membrane device 23 for covering the first valve through-opening 21.

Accordingly, the second pressure compensation valve 20 comprises a second valve through-opening 22 and a second membrane device 24 for covering the second valve through-opening 22.

In the first and the second valve through-opening opening 21, 22, a respective cross-shaped retaining structure 25 is formed in the middle or center of a receiving opening 26.

The first and the second membrane device 23, 24 are bulbous or convex in shape and comprise a central connecting pin 27 having a corresponding locking element 28 for connecting to the receiving opening 26.

The first and the second membrane device 23, 24 are arranged on different or opposing sides of the pressure cap 11.

Furthermore, on the pressure cap 11, on the side opposite a space to be degassed, a frame 29 is formed so as to radially circumferentially surround the first and the second valve through-opening 21, 22. In the frame 29, a support structure 30 is formed.

A gas-permeable protective membrane 31 is arranged on the support structure 30.

A lid 32 is additionally provided, wherein the frame 29 and the lid 32 bound a pressure compensation space 33.

The lid 33 covers the pressure compensation space 32 and is arranged so as to be spaced apart from the frame 29 in such a way that a pressure compensation gap 34 is formed between the frame 29 and the lid 33 in a radially circumferential manner.

The lid 33 is connected to the frame via a hinge element 35, preferably a film hinge, and a catching element device 36.

Figure 18:
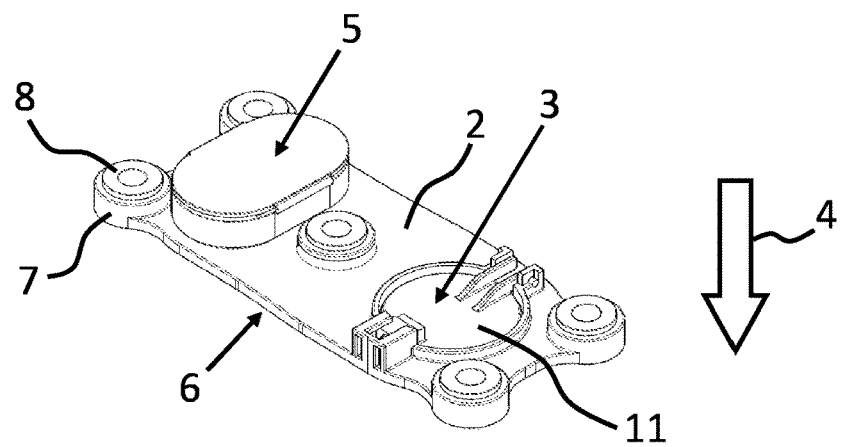
Figure 19:
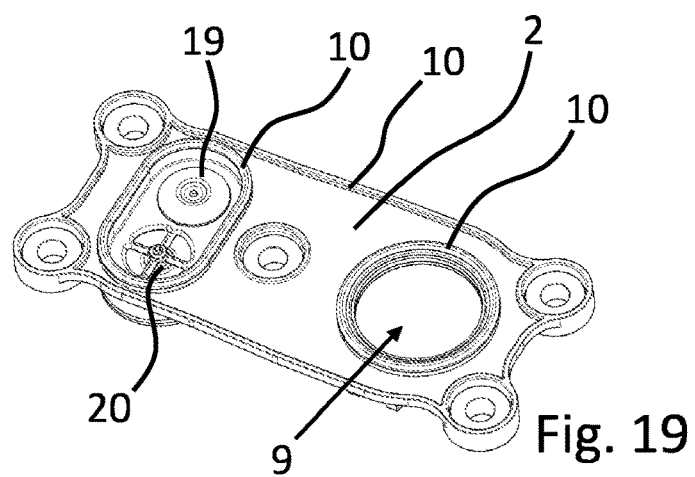

In the following, an emergency degassing valve apparatus 1 according to the present disclosure is briefly described in further detail according to a second exemplary embodiment (FIGS. 18 and 19). Unless otherwise described, the emergency degassing valve apparatus 1 according to the second exemplary embodiment has the same technical features as the emergency degassing valve apparatus 1 according to the first exemplary embodiment. Identical technical features bear the same reference numerals.

In the emergency degassing valve apparatus 1 according to the second exemplary embodiment, the base body 2 is approximately rectangular in shape, wherein the pressure compensation element 5 is not arranged in the pressure cap 11 of the emergency degassing valve 3; rather, the emergency degassing valve 3 and the pressure compensation element 5 are arranged or configured adjacent to one another in the base body.

Furthermore, according to the present disclosure, a housing (not shown) having one of the aforementioned emergency degassing valve apparatuses is provided.

LIST OF REFERENCE NUMERALS

1 Emergency degassing valve apparatus
2 Base body
3 Emergency degassing valve
4 Assembly direction
5 Pressure compensation element
6 Assembly wall
7 Bushing receptacle
8 Mounting socket
9 Emergency degassing opening
10 Sealing device
11 Pressure cap
12 Hinge
13 Spring device
14 Receiving elements
15 Receiving space
16 Spring-retaining element
17 Spring-receiving space
18 Spring
19 First pressure compensation valve
20 Second pressure compensation valve
21 First valve through-opening
22 Second valve through-opening
23 First membrane device
24 Second membrane device
25 Retaining structure
26 Receiving opening
27 Connecting pin
28 Catching element
29 Frame
30 Support structure
31 Protective membrane
32 Lid
33 Pressure compensation space
34 Pressure compensation gap
35 Hinge element
36 Catching element

What is claimed is:

1. An emergency degassing apparatus, comprising: a base body, an degassing valve having an degassing opening and a pressure cap for closing the emergency degassing opening, and a pressure compensation element (DAE) having a first and a second pressure compensation valve, wherein a spring device is provided, which is configured so as to exert a specified force on the pressure cap so that the pressure cap is retained in a closed position, wherein the spring device is configured such that, upon reaching a specified internal pressure in a space to be degassed, the spring device releases the pressure cap.

2. The emergency degassing apparatus according to claim 1, wherein the pressure compensation element is arranged in the pressure cap of the degassing opening of the degassing valve.

3. The emergency degassing apparatus according to claim 1, wherein the pressure cap is connected via a hinge or rotary joint to the base body adjacent to the degassing opening in an articulated or collapsible manner.

4. The emergency degassing apparatus according to claim 3, wherein the spring device comprises: a rod-shaped spring, at least one receiving element arranged on the base body in the region of the degassing opening and opposite the rotary joint, wherein the at least one receiving element comprises a receiving space for receiving the spring, and a spring-retaining element arranged on the pressure cap, wherein, upon reaching the specified internal pressure in the space to be degassed, the spring device is released from at least one of the at least one receiving element or the spring-retaining element and thereby releases the pressure cap.

5. The emergency degassing apparatus according to claim 1, wherein the first and the second pressure compensation valve of the pressure compensation element comprise a first and a second valve through-opening and a first and a second membrane device for respectively closing the first and the second valve through-opening, wherein the first and the second pressure compensation valve are arranged in parallel to one another so that the pressure compensation valve forms a double check valve.

6. The emergency degassing apparatus according to claim 1, wherein the pressure compensation valve comprises a cover device, wherein the cover device comprises a frame and a lid bounding a pressure compensation space, and wherein the frame is arranged so as to surround a first and a second valve through-opening and the lid covers the pressure compensation space, wherein the lid is arranged so as to be spaced apart from the frame such that a pressure compensation gap is formed between the frame and the lid.

7. The emergency degassing apparatus according to claim 6, wherein the pressure compensation space comprises a gas-permeable protective membrane connected to the frame in the region of the lid so that the first and the second pressure compensation valve are covered by the gas-permeable protective membrane.

8. The emergency degassing apparatus according to claim 1, wherein the pressure compensation element is arranged adjacent to the degassing valve in the base body.

9. A housing having an emergency degassing valve apparatus according to claim 1, wherein the emergency degassing valve apparatus is connected to a housing of a space to be degassed.

* * * * *